United States Patent Office 2,891,852
Patented June 23, 1959

2,891,852

NITROHYDROCARBON GELS

Raymond E. Schaad, Riverside, Ill., assignor to Universal Oil Products Company, Des Plaines, Ill., a corporation of Delaware No Drawing. Application December 6, 1955
Serial No. 551,233

9 Claims. (Cl. 52—.5)

This application relates generally to new compositions of matter comprising gelled nitrohydrocarbons, and more specifically, to new compositions of matter comprising nitrohydrocarbons and a diaryl-desoxy-ketitol. Still more specifically, this invention relates to a new composition of matter comprising a nitroparaffin and a product formed by condensing a ketose with two molecular proportions of an aromatic hydrocarbon in the presence of a condensation catalyst at condensation conditions. The new compositions of the present invention are useful as rocket fuels and/or for military purposes particularly where semisolid or gelled fuels are desirable. Semisolid or gelled fuels are utilized by the military forces in bombs of the bursting and tail-ejection type, and as an incendiary fuel for use in flame throwers, hand grenades, etc.

Nitrohydrocarbons, and particularly liquid nitroparaffins, have heretofore been employed as propellants in jet propulsion devices, and they have also been used in explosives of different varieties. It is desirable and in some cases necessary for some types of operating conditions to employ the normally liquid nitrohydrocarbons in the solid or semisolid form or gel, for these purposes. Up to the present time, difficulty has been encountered when an attempt was made to produce gels from the various liquid nitrohydrocarbons and particularly nitroparaffins, without seriously affecting their oxygen balance and otherwise changing their properties.

The present invention overcomes these and other difficulties by providing novel gelled compositions of matter comprising nitrohydrocarbons and diaryl-desoxy-ketitols. These novel compositions of matter are semisolid or solid gels which retain their consistency for long periods of time without undergoing marked change in properties.

In one embodiment, the present invention relates to a composition of matter comprising a nitrohydrocarbon and a diaryl-desoxy-ketitol.

In another embodiment the present invention relates to a composition of matter comprising a nitroparaffin and a diaryl-desoxy-ketitol.

Still another embodiment of this invention relates to a new composition of matter comprising a nitrohydrocarbon and a ditolyl-desoxy-ketitol.

A further embodiment of this invention relates to a composition of matter comprising a nitroparaffin and a ditolyl-desoxy-ketitol.

As set forth hereinabove the novel compositions of matter of the present invention comprise gelled mixtures of nitrohydrocarbons and the product formed by condensing a ketose with two molecular proportions of an aromatic hydrocarbon in the presence of a condensation catalyst at condensation conditions. The nitrohydrocarbon with which the diaryl-desoxy-ketitol is composited may be selected from innumerable pure nitrohydrocarbons and mixtures thereof. The nitrohydrocarbon or nitrohydrocarbons may be saturated, unsaturated, or aromatic. The nitroparaffins are particularly preferred. Nitrohydrocarbons utilizable in forming the new compositions of matter of the present invention include any of the liquid nitroparaffins, such as nitromethane, dinitromethane, nitroethane, dinitroethane, nitropropane, nitrobutane, nitropentane, nitrohexane, nitroheptane, nitrooctane, nitrononane, nitrodecane, nitroundecane, etc., including their many isomeric structures; nitrocyclopentane, nitromethylcyclopentane, nitrodimethylcyclopentane, nitrocyclohexane, nitromethylcyclohexane, nitroethylcyclohexane, nitrodimethylcyclohexane, etc., nitrobenzene, o-nitrotoluene, m-nitrotoluene, p-nitrotoluene, 3-nitro-o-xylene, 4-nitro-o-xylene, 2-nitro-m-xylene, 4-nitro-m-xylene, 5-nitro-m-xylene, 2-nitro-p-xylene, o-nitroethylbenzene, p-nitroethylbenzene, ortho- and para-nitrocumene, 2-nitrocymene, etc. Other nitrohydrocarbons utilizable within the broad scope of this invention are readily apparent to one skilled in the art.

The novel composition of the present invention comprises the nitrohydrocarbon as described hereinabove, and a diaryl-desoxy-ketitol. These diaryl-desoxy-ketitols are formed by reacting a ketose sugar or ketose carbohydrate with two molecular proportions of an aromatic compound to yield products in which each of the aryl groups of the aromatic compound reactant is bound chemically to the original carbonyl carbon atom of the ketose. The condensation of an aromatic hydrocarbon with a ketose sugar or ketose carbohydrate may be carried out in the presence of various condensation catalysts at condensation conditions. For example, this condensation reaction may be carried out in the presence of substantially anhydrous hydrogen fluoride at a temperature of from about —20° to about 100° C. and preferably at a temperature of from about —10° to about 50° C. Other suitable catalysts include metal halides of the Friedel-Crafts type, particularly aluminum chloride, as such or modified by the addition thereto of an alcohol, ether, ester, alkyl halide, and the like. Mixtures of boron trifluoride and hydrogen fluoride may also be employed. These condensation reactions may be carried out in glass or steel equipment depending upon the particular condensation catalyst utilized, or in other suitable apparatus constructed from silver, copper, and certain alloys such as Monel metal and the like. The pressure at which the reaction is carried out will vary from atmospheric pressure to pressures of 50 or 100 atmospheres or more and will be dependent upon the particular condensation catalyst utilized, the reaction temperature employed, the mol fractions of reactants utilized, and the volume of the particular reactor in which the condensation reaction is conducted. In many instances, it is convenient to operate at the pressure generated by the mixture of reactants and catalyst employed.

Aromatic hydrocarbons suitable for use in the production of diaryl-desoxy-ketitols utilized in the composition of the present invention include benzene, toluene, o-xylene, m-xylene, p-xylene, ethylbenzene, 1,2,3-trimethylbenzene, 1,2,4-trimethylbenzene, 1,3,5-trimethylbenzene or mesitylene, o-ethyltoluene, p-ethyltoluene, n-propylbenzene, isopropylbenzene, or cumene, butylbenzene, amylbenzene, and higher molecular weight alkylaromatic hydrocarbons such as formed by the alkylation of low molecular weight aromatic hydrocarbons with alkylating agents such as olefin polymers, i.e., nonenes, decenes, etc. formed from the polymerization of propylene. These higher molecular weight alkylaromatic hydrocarbons include such materials as hexylbenzenes, hexyltoluenes, nonylbenzenes, nonyltoluenes, dodecylbenzenes, dodecyltoluenes, etc. Often, alkylate is obtained as a high boiling fraction in which case the alkyl group attached to the aromatic hydrocarbon may contain from about 6 to about 24 carbon atoms. Other aromatic hydrocarbons suitable for conversion into diaryl-desoxy-ketitols include those with two or more aryl groups, such as diphenyl, diphenylmethane, triphenylmethane, etc. Also, examples of suitable aromatic hydrocarbons which contain condensed benzene rings include naphthalene, anthracene, phenanthrene, and also alkylated naphthalenes, alkylated anthracenes, and the like.

The ketoses which are condensed with aromatic hydrocarbons to form the diaryl-desoxy-ketitols utilized in the novel compositions of matter of this invention are monosaccharides, and according to their chemical nature may be considered to be hydroxy ketones. According to the number of oxygen atoms present in the molecule of the ketose, they are called trioses, tetroses, pentoses, hexoses, and the like. These ketoses have the general formula $C_nH_{2n}O_n$ in which $n$ generally equals 3 to about 8. With the exception of the simplest ketose, dihydroxyacetone, all of these monosaccharides have one or more asymmetric carbon atoms and must appear in stereoisomeric forms.

The diarylated ketose or diaryl-desoxy-ketitols, may also be prepared from aromatic hydrocarbons and polysaccharides which yield ketose units on hydrolysis. Such polysaccharides include sucrose, inulin, turanose, raffinose, gentianose, melezitose, stachyose, verbascose.

The simplest ketose which may be condensed with aromatic hydrocarbons to form the diaryl-desoxy-ketitols utilized in the novel composition of this invention may be represented by the formula:

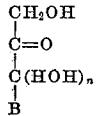

in which $n$ is an integer of from about 1 to about 8 and B represents hydrogen and $CH_2OH$. As an example of the utility of this general formula, when $n$ equals 1 and B equals hydrogen, the compound is the symmetrical dihydroxyacetone. When $n$ equals 1 and B equals $CH_2OH$, the compound is erythrose; when $n$ equals 2 and B equals $CH_2OH$, the compound is psicose, fructose, sorbose, and tagatose; and when $n$ equals 4 and B equals $CH_2OH$, the compounds are heptoses.

As set forth hereinabove, the novel compositions of matter of the present invention comprise a nitrohydrocarbon and a diaryl-desoxy-ketitol prepared by condensing a ketose with two molecular proportions of an aromatic hydrocarbon at condensation conditions in the presence of a condensing agent. Suitable condensing agents set forth include aluminum chloride, as such or modified, other Friedel-Crafts metal halides, mixtures of hydrogen fluoride, and boron trifluoride, and hydrogen fluoride itself. When hydrogen fluoride itself is utilized as the condensing agent, it may be used in anhydrous form or diluted with water to make a hydrofluoric acid of the desired concentration. The hydrofluoric acid may also be modified or diluted further with various inert diluents when it is desired to operate the process with low hydrogen fluoride concentration. Suitable inert diluents include perfluoro derivatives of n-paraffinic hydrocarbons such as perfluoropropane, perfluoro-n-butane, perfluoro-n-pentane, etc. In some instances, hydrofluoric acid of from about 85 to about 100% HF concentration is desirable, and in some other instances, it is desirable to use substantially anhydrous hydrogen fluoride as the catalyst.

When hydrogen fluoride is utilized as the condensation agent, the condensation reaction may be carried out by adding hydrogen fluoride slowly to a stirred mixture of aromatic hydrocarbon and ketose, or reversely, a mixture of aromatic hydrocarbon and ketose, may be added with stirring to hydrogen fluoride while maintaining the condensation temperature at from about $-20°$ to about $100°$ C. By using suitable cooling and/or heating means, it is often advisable or desirable to commingle the reactant and condensing agent at a relatively low temperature such as from about $-80°$ to about $-30°$ C. and then to permit the reaction mixture to warm gradually while the reactants and catalyst are stirred by suitable means such as a motor driven stirrer or other mixing equipment. After the reaction has reached the desired degree of completion, the hydrogen fluoride condensing agent may be removed from the reaction mixture by distillation at atmospheric pressure or lower, or by passing an inert gas through the reaction mixture while maintaining it at relatively low temperature. Also, the entire reaction mixture and catalyst may be mixed with water or may be added to ice in order to quench the activity of the condensing agent and to permit separation of the organic reaction products and unreacted starting materials from the catalyst. The organic reaction products may also be separated from the condensing agent by means of an organic solvent such as ether, in which some of the organic material may be dissolved. Further methods of isolating the reaction products are illustrated in the example.

The novel composition of matter of this invention may be prepared simply by admixing the desired nitrohydrocarbon or nitrohydrocarbon mixture with the desired diaryl-desoxy-ketitol. In general, to form stable gels, the amount of diaryl-desoxy-ketitol admixed with the desired nitrohydrocarbon, particularly nitroparaffin, will range from about 0.1 to about 25% by weight. Of course, the maximum amount by weight of the diaryl-desoxy-ketitol which is admixed with the nitrohydrocarbon will depend upon the specific solubility of the particular diaryl-desoxy-ketitol therein. Thus, where the diaryl-desoxy-ketitol is produced from an aromatic hydrocarbon containing long chain alkyl groups, the dialkyl-desoxy-ketitol will not be as compatible with the nitrohydrocarbon as when lower molecular weight aromatic hydrocarbons are used in forming or producing the diaryl-desoxy-ketitol. Since the diaryl-desoxy-ketitol is the more expensive of the two components of the novel composition of this invention, a minimum quantity to form the desired gel will be in most cases the maximum quantity utilized. This minimum amount of course can vary as it may be desirable to vary the stiffness of the gel from time to time. In most cases, the preferred amount of diaryl-desoxy-ketitol will vary from about 1 to about 15% by weight based on the nitrohydrocarbon utilized in forming this new composition of matter.

As set forth hereinabove, the novel composition of matter of this invention is prepared by admixing the nitrohydrocarbon or mixture of nitrohydrocarbons or a nitroparaffin with a diaryl-desoxy-ketitol. This mixing can be carried out in any desired manner as, for example, a batch type operation. Mixing can be carried out at room temperature or higher as is desirable since the solubility of the diaryl-desoxy-ketitols and nitrohydrocarbons is limited. It is often desirable, and in some cases, necessary, to heat the mixture to form a clear solution which on cooling sets to a clear stiff gel. This heating can be carried out up to temperatures of $200°$ C. or higher, the limiting temperature of course being the boiling or decomposition point of the particular nitrohydrocarbon utilized in forming this novel composition of matter. The gels formed will range in type from semisolids or stiff gels down to varying plastic, semiliquid types.

The novel composition of matter nitrohydrocarbon gels, particularly nitroparaffin gels, prepared in accordance with the disclosure in this specification, may be employed either as explosives or as self-combustible propellants, depending upon the manner of use. The gels are explosive when detonated with sufficient force but may be readily adapted to be burned as fuels, particularly in jet propulsion motors, in the absence of detonation. If it is desired to prepare a nitrohydrocarbon gel, particularly a nitroparaffin gel to be used as an explosive, a sensitizer is incorporated into the liquid nitrohydrocarbon, particularly nitroparaffin, prior to gelling. Such sensitizers comprise organic amines including the aromatic amines as aniline, diphenylethylene diamine, and the like, and aliphatic amines such as diethylamine, tetraethylene pentamine and the like. The nitroparaffin gel in which a sensitizer such as one of the organic amines is incorporated, is much more sensitive to detonation than is the gel in the absence of such a sensitizer, although it is to be understood that the use of a sensitizer is optional; and the gels may be employed as explosives either with or without a sensitizer.

The process of this invention is illustrated further by the following examples which are incorporated herein for the purpose of illustration and with no intention of unduly limiting the generally broad scope of this invention.

EXAMPLE I

This example illustrates the preparation of gels from nitrohydrocarbons and the condensation product of fructose and two molecular proportions of toluene. The reaction of fructose with toluene was carried out in the presence of liquid hydrogen fluoride at temperatures ranging from 0° to 30° C. utilizing contact times of from about 3 to about 66 hours.

An outline of the procedure used in reacting d-fructose with toluene in the presence of hydrogen fluoride is as follows: d-fructose and toluene were sealed into a turbomixer 1-liter autoclave. After cooling to about −40° C., hydrogen fluoride was added to the turbomixer autoclave under pressure from a weighed autoclave, and the contents of the autoclave were then stirred for the required time at ice temperature, and in one case at 30° C. At the end of the reaction time, a stream of nitrogen was passed through the reactor for 1–3 hours, thus removing most of the hydrogen fluoride. The autoclave was opened and the contents transferred to a silver dish which was later placed in a hood-draft for 18–24 hours, after which the hydrogen fluoride remaining in the product was minor. The product was then washed thoroughly with pentane to remove pentane-soluble components after which it was separated into a cold water-soluble fraction and a cold water-insoluble fraction. Each of these three fractions then was worked up separately to obtain the pure compounds therefrom. The desired product is found in the pentane insoluble-water insoluble fraction as a normal propyl alcohol soluble portion thereof. The reactions carried out and the recovery of the desired condensation product are summarized in the following table:

Table I

REACTION OF D-FRUCTOSE WITH TOLUENE IN THE PRESENCE OF HYDROGEN FLUORIDE

[Charge: (a)—d-fructose—50 grams; toluene—170 grams; HF—220 grams.]

| Run No. | 21 | 22 | 23 | 24 | 25 | 26 | 27 |
|---|---|---|---|---|---|---|---|
| Conditions of Reaction: | | | | | | | |
| Temp., °C. | 0 | 0 | 0 | 0 | 0 | 0 | 30 |
| Contact Time, Hrs. | 3 | 5 | 16.7 | 20 | 45 | 66 | 3 |
| Recovery, Grams: | | | | | | | |
| Pentane-Soluble | | 2 | 2 | 1 | | 10 | 24 |
| Water-Soluble | 42 | 50 | 39 | 35 | 15 | 10 | 1.3 |
| Water-Insoluble (b) | 7 | 15 | 35 | 48 | 84 | 139 | 84 |
| Net Total | 49 | 67 | 76 | 84 | 99 | 159 | 109.3 |
| Toluene Reacted, gms. | 0 | 17 | 26 | 34 | 49 | 91 | 59 |
| Percent of Water-Insoluble Material, also Acetone-Soluble | 44 | 56 | 83 | 97 | 100 | 100 | 50 |
| Acetone-Soluble, gms. | 18 | 28 | 32 | 34 | 15 | 10 | 0.6 |
| Yield of C$_{13}$H$_{18}$O$_5$, grams | 9 | 14 | 20 | 19 | 2 | | 0 |
| Yield of C$_{20}$H$_{24}$O$_3$, grams | | 5 | 11 | 16 | 28 | 46 | |

(a) In Run 26, the charge was: d-fructose—75 grams; toluene—215 grams; HF—336 grams.
(b) Exclusive of pentane-soluble.

In the work with fructose at 0° C., it was observed that the reaction was slow. Three hours of contacting at 0° C. resulted in a small amount of total reaction product but as the contact time was increased the amount of toluene reacting also increased. The data given in the table show that the water-soluble portion increased rapidly with time and then fell off, while there was a steady increase in the water-insoluble fraction with time.

An examination of the water-insoluble portion of the reaction products showed that it contained a compound which could be isolated by extraction and crystallization with n-propyl alcohol, by which method it was recovered in quantities amounting to about 30% of the water-insoluble fraction.

This substance hereinafter referred to as ditolyl-desoxyfructose melts at 210° C. and has been assigned the following structural formula:

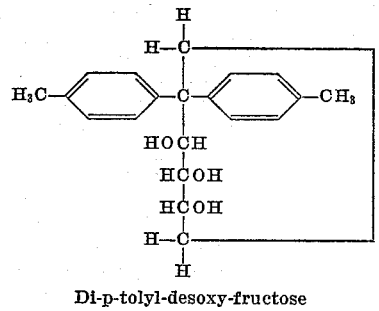

Di-p-tolyl-desoxy-fructose

It should be noted that the above compound contains a cyclohexane ring structure with two aryl groups attached to the same carbon atom. This structure has been assigned to this compound on the basis of the following evidence:

(1) Elementary analysis:

| | Percent C | Percent H |
|---|---|---|
| Found, di-p-tolyl-desoxy-fructose | 76.53 | 7.68 |
| Calculated for C$_{20}$H$_{24}$O$_3$ | 76.89 | 7.74 |

Shows a molecule containing 2 tolyl residues, 1 fructose residue, and 3 oxygen atoms.

(2) Oxidation of the di-p-tolyl-desoxy-fructose yielded 4,4′-di-carboxybenzophenone. Therefore, the structural unit illustrated below is present:

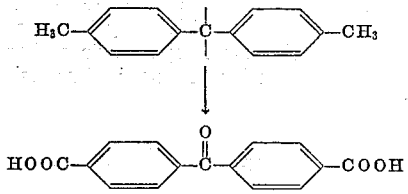

(3) The compound forms a triacetate when refluxed with acetic anhydride and pyridine. A crystalline acetate derivative, melting point 157° C., is isolated.

Elementary analysis:

| | Percent C | Percent H |
|---|---|---|
| Found for Acetate | 71.28 | 6.88 |
| Calculated for C$_{26}$H$_{30}$O$_6$ | 71.21 | 6.90 |

This shows that the 3 oxygen atoms demanded by the structural formula are hydroxyl oxygen atoms.

(4) The compound contains no olefinic double bond. The compound is stable to alkaline permanganate solution and does not decolorize chloroform colored with bromine.

These data are all in accordance with the above-cited structure and exclude other possible structures except where the saturated carbon ring may be other than a $C_6$ ring, i.e., a $C_5$ ring.

All evidence considered, the above constitution is assigned to the diarylated fructose obtained. This is a 4,4-bis-(4-methylphenyl)-x,x''-cycloalkane triol and on the basis of present evidence is considered to be 4,4-bis-(4-methylphenyl)-1,2,3-cyclohexane-triol.

This compound, namely, 4,4-bis-(4-methylphenyl)-1,2,3-cyclohexane-triol forms stiff gels with nitromethane and other nitroparaffins. 10% by weight of this compound was added to nitromethane in a glass flask. The flask was then placed on a hot plate and heated to cause gentle boiling of the nitromethane. The solid di-aryl-desoxy-ketitol dissolved and the flask was then allowed to stand for a short time to cool. Upon cooling a fine gel-like deposit precipitated after standing for about 50 minutes. The flask was then heated again to the boiling point of nitromethane and permitted to stand and cool. On cooling, a gel-like material formed. A small amount of this gelled nitromethane was placed on a piece of glass and a burner flame was impinged on its surface. The gel burned with a bluish flame accompanied by bright yellow flashes of light from the surface of the gel.

EXAMPLE II

1-Sorbose was reacted with toluene in the presence of hydrogen fluoride in a manner similar to that described in Example I. The following reactants were charged to a 1.1 liter turbomixer autoclave: 50 grams of 1-sorbose, 172 grams of toluene, 243 grams of hydrogen fluoride. The mixture was contacted for 45 hours at 0° C. and at atmospheric pressure. At the end of the 45 hours, most of the hydrogen fluoride was flushed from the system by passing a stream of nitrogen through the autoclave. The reaction product, when practically free of hydrogen fluoride, weighed 126 grams. From the 126 grams was obtained 82.5 grams of a toluene-free, hydrogen fluoride-free product. This product was separated into 7 grams of a pentane-soluble material, 14 grams of a water-soluble material, and 61.5 grams of a water-insoluble product.

From this latter water-insoluble product 18.5 grams of a pure material melting at 215° C. was obtained. Chromic acid oxidation of a portion of this pure material yielded 4,4'-dicarboxybenzophenone, identified by its dimethyl ester melting at 222–224° C. Equal parts of the sorbose product melting at 215° C., and the fructose product melting at 209–210° C. (Example I) give a mixed melting point of 204–206° C. and therefore the compounds are assumed not to be identical. They are, however, stereoisomers and differ only in the configuration of their respective three asymmetric carbon atoms. The ditolyl-sorbose reaction product is thus assigned the structure:

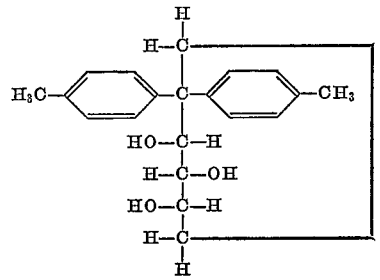

It should again be noted that the di-p-tolyl-desoxy-sorbose condensation product is assumed to contain a cyclohexane ring structure.

Five percent by weight of this di-p-tolyl-desoxy-sorbose was dissolved in warm nitromethane which on cooling formed a clear, stable, stiff gel.

I claim as my invention:

1. A composition of matter consisting essentially of a nitrohydrocarbon selected from the group consisting of nitroparaffins, nitrocycloparaffins and nitroaromatic hydrocarbons and from about 0.1 to about 25% by weight of a diaryl-desoxy-ketitol.

2. A composition of matter consisting essentially of a nitrohydrocarbon selected from the group consisting of nitroparaffins, nitrocycloparaffins and nitroaromatic hydrocarbons and from about 0.1 to about 25% by weight of a di-p-tolyl-desoxy-ketitol.

3. A composition of matter consisting essentially of a nitrohydrocarbon selected from the group consisting of nitroparaffins, nitrocycloparaffins and nitroaromatic hydrocarbons and from about 0.1 to about 25% by weight of 4,4-bis-(4-methyl-phenyl)-1,2,3-cyclohexane-triol.

4. A composition of matter consisting essentially of a nitroparaffin and from about 0.1 to about 25% by weight of a diaryl-desoxy-ketitol.

5. A composition of matter consisting essentially of a nitroparaffin and from about 0.1 to about 25% by weight of a di-p-tolyl-desoxy-ketitol.

6. A composition of matter consisting essentially of a nitroparaffin and from about 0.1 to about 25% by weight of 4,4 - bis - (4-methylphenyl)-1,2,3-cyclohexane-triol.

7. A composition of matter consisting essentially of nitromethane and from about 0.1 to about 25% by weight of a diaryl-desoxy-ketitol.

8. A composition of matter consisting essentially of nitromethane and from about 0.1 to about 25% by weight of a di-p-tolyl-desoxy-ketitol.

9. A composition of matter consisting essentially of nitromethane and from about 0.1 to about 25% by weight of 4,4-bis-(4-methylphenyl)-1,2,3-cyclohexane-triol.

References Cited in the file of this patent
UNITED STATES PATENTS

| | | |
|---|---|---|
| 2,460,803 | Bonner et al. | Feb. 8, 1949 |
| 2,699,385 | Stevens et al. | Jan. 11, 1955 |